Patented Apr. 26, 1927.

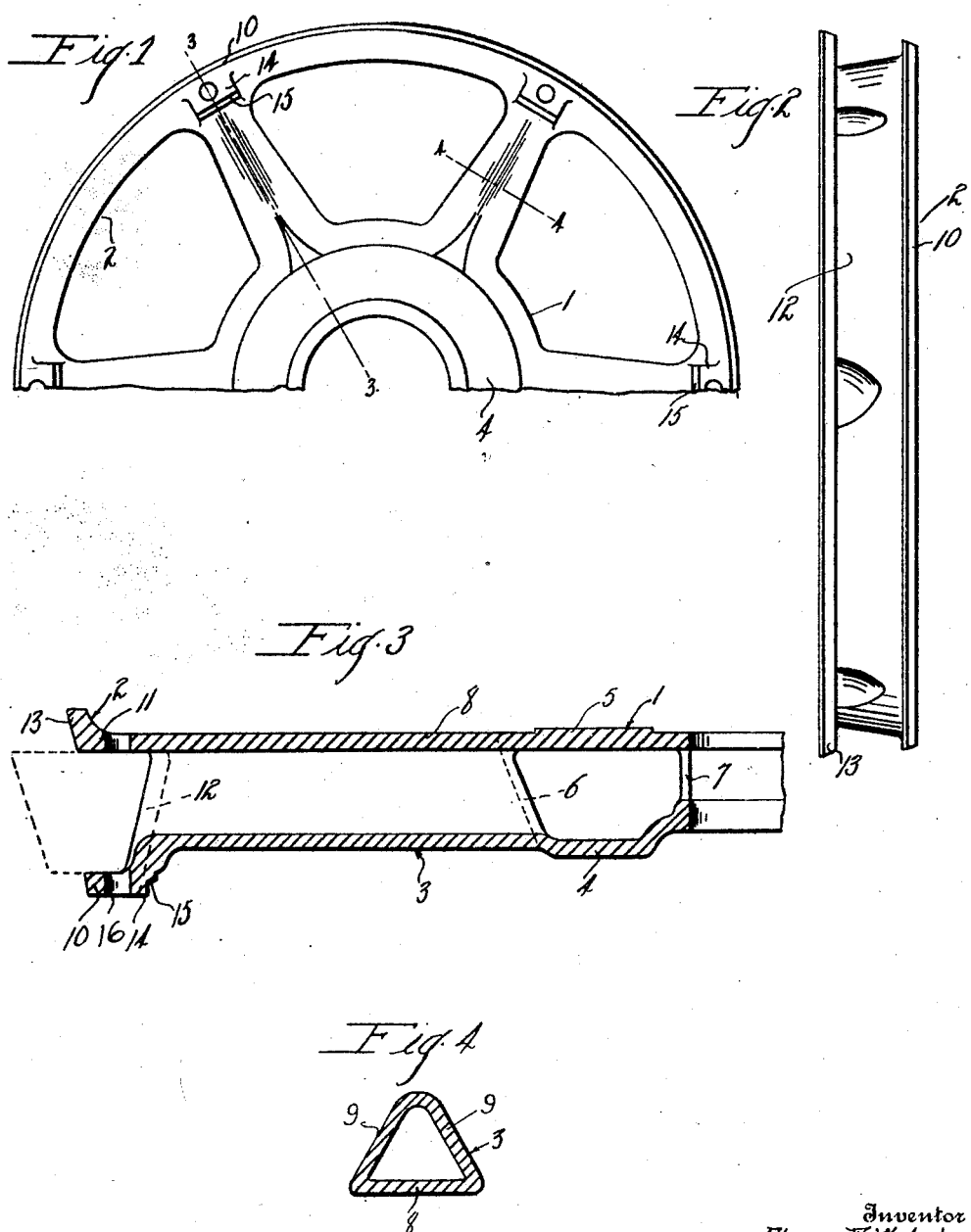

1,625,876

UNITED STATES PATENT OFFICE.

ELMER F. WATERBOR, OF DETROIT, MICHIGAN, ASSIGNOR TO CHRISTINE McD. SIMPSON, OF DETROIT, MICHIGAN.

CAST WHEEL.

Application filed January 18, 1926. Serial No. 82,137.

The invention relates to cast wheels and has for one of its objects the provision of a cast wheel including a hub, spokes and a felly so arranged that molding including the coring is greatly simplified. Another object is the provision of a cast wheel so constructed that practically all of the wheel may be formed in one section of the mold. A further object is the provision of a cast wheel so arranged that a one piece core may be used in forming the wheel. With these as well as other objects in view the invention resides in the novel features of construction and combinations and arrangements of parts as more fully hereinafter set forth.

In the drawings:—

Figure 1 is a side elevation of a portion of a cast wheel embodying my invention;

Figure 2 is an edge elevation thereof;

Figures 3 and 4 are cross sections, respectively, on the lines 3—3 and 4—4 of Figure 1.

The cast wheel is preferably formed of malleable iron and comprises the hub 1, the felly 2 and the spokes 3 integral with and connecting the hub and felly. The hub is hollow and has the spaced front and rear walls 4 and 5, respectively, and the peripheral wall 6 connecting these walls. Suitable reinforcing and spacing bars 7 are preferably provided extending between the inner edges of the front and rear walls. The spokes are hollow and have a substantially triangular cross section, each spoke having a rear wall 8 extending in substantially the plane of the rear wall 5 of the hub and having the converging walls 9 extending from the rear wall toward the front side of the wheel. The felly comprises the front and rear side flanges 10 and 11, respectively, and the web 12 connecting these side flanges, the rear side flange being in substantially the plane of the rear walls of both the spokes and hub. The front side flange has a periphery preferably forming a flared seat and the rear side flange terminates in the transverse flange 13 forming a flared seat of greater diameter than the other flared seat, both flared seats being adapted for engagement with a demountable rim.

Both the web of the felly and the peripheral wall of the hub diverge from the rear to the front sides of the wheel so that their faces, as well as the faces formed by the converging walls of the spokes, are inclined transversely from the rear side of the wheel to the front, whereby draft is provided for removing the wheel pattern from the mold. Since the rear side of the wheel is substantially in the same plane, practically all of the wheel may be formed in one section, such as the drag of the mold, thereby permitting the use of a very shallow cooperating mold section, such as the cope. Also since the channel formed within the felly is uninterrupted and opens radially outwardly of the wheel and since this channel registers directly with the interiors of the spokes which register directly with the interior of the hub, a one piece core may be used in forming the wheel and this core may be accurately positioned with reference to the mold cavity to provide for the proper thickness of the walls of the hub spokes and felly.

To provide fulcrum bearings for the lugs which clamp the demountable rim upon the felly of the wheel, I form the radially inwardly projecting extensions 14 at the inner side of the felly 2 with the rabbeted portions 15 forming transverse bearing shoulders which are engageable with the fulcrum portions of the clamping lugs. Holes 16 are also provided in the side flanges of the felly and radially outwardly beyond the fulcrum shoulders for receiving the clamping bolts.

What I claim as my invention is:

1. A cast wheel including a hub, spokes integral with said hub and a felly integral with said spokes having side flanges and a web forming an uninterrupted channel opening radially outwardly of the wheel, said hub, spokes and felly having connected inclined faces extending transversely from one side of the wheel to the other.

2. A cast wheel including a hollow hub, hollow spokes integral with said hub and a felly integral with said spokes having side flanges and a web forming an uninterrupted channel opening radially outwardly of the wheel, said hub spokes and felly having connecting inclined faces extending transversely from the rear face of the wheel to the front face thereof.

3. A cast wheel including a hollow hub having spaced front and rear walls, and a peripheral wall extending therebetween, hollow spokes of triangular cross section integral with said hub and a felly having spaced side flanges and a web forming an uninterrupted channel opening radially outwardly of the wheel, one of the side flanges of said felly and one of the walls of each of said spokes lying substantially in the same plane with one of the walls of said hub and forming one side of the wheel, the peripheral wall of said hub and the web of said felly diverging from one side of the wheel to the other.

4. A cast wheel including a hollow hub having front and rear spaced walls and a peripheral wall extending therebetween, spokes of triangular cross section integral with said hub each having a wall in substantially the same plane as the rear wall of said hub and a felly integral with said spokes and having front and rear side flanges of different height, and a web forming an uninterrupted channel opening radially outwardly of the wheel, the rear side flange of said felly being in substantially the same plane as the rear wall of said hub and the web of said felly and peripheral wall of said hub diverging from said rear side flange and rear hub wall respectively.

In testimony whereof I affix my signature.

ELMER F. WATERBOR.